United States Patent [19]

Wells

[11] Patent Number: 5,169,541
[45] Date of Patent: Dec. 8, 1992

[54] HAZARDOUS MATERIALS SPILLAGE INHIBITOR FOR USE WITH SERVICE STATION FUEL FILTERS

[75] Inventor: Thomas L. Wells, Houston, Tex.

[73] Assignee: Welex Environmental, Inc., Victoria, Tex.

[21] Appl. No.: 790,197

[22] Filed: Nov. 8, 1991

[51] Int. Cl.$^5$ .................... B67D 5/33; B01D 35/14
[52] U.S. Cl. .................... 210/767; 137/312; 141/86; 141/88; 210/232; 210/248; 210/433.1; 222/108
[58] Field of Search ............ 137/312, 313; 141/86, 141/88, 115; 210/232, 248, 542, 433.1, 600, 767; 222/108; 184/1.5

[56] References Cited

U.S. PATENT DOCUMENTS

| | | | |
|---|---|---|---|
| 4,376,703 | 3/1983 | Krauss | 222/108 |
| 4,451,368 | 5/1984 | Pandelena et al. | 210/248 |
| 4,676,281 | 6/1987 | Nord | 141/115 |
| 4,877,155 | 10/1989 | Tull | 222/108 |
| 4,901,693 | 2/1990 | Degrazia, Jr. | 184/1.5 |
| 4,913,813 | 4/1990 | Covarrubias et al. | 210/248 |
| 4,929,356 | 5/1990 | Todd | 210/248 |
| 5,030,345 | 7/1991 | Thomas | 210/248 |
| 5,058,774 | 10/1991 | Hartman et al. | 222/108 |

Primary Examiner—Mary Lynn Theisen
Assistant Examiner—Joseph Drodge
Attorney, Agent, or Firm—D. Arlon Groves

[57] ABSTRACT

Apparatus and methods are described for inhibiting the unintentional spillage of hazardous materials, particularly while changing filters or other storage media in environments such as service station fuel dispensers and other fuel depots. A preferred embodiment includes mechanisms for permanently attaching such apparatus and securing the same against unintended rotational or translational displacement, as well as collecting and diverting mechanisms and mechanisms to inhibit the improper removal of such filters or storage media.

12 Claims, 2 Drawing Sheets

HAZARDOUS MATERIALS SPILLAGE INHIBITOR FOR USE WITH SERVICE STATION FUEL FILTERS

BACKGROUND OF THE INVENTION

This invention is of important beneficial effect to the environment and relates primarily to apparatus for the prevention of hydrocarbon spillage at fuel dispensers of the type generally utilized at service stations, fuel depots and the like. It also has utility for the prevention of spillage at other types of equipment requiring periodic maintenance.

While the exact number of fuel dispensing stations serving the public in this country may not be known, it is known that it is upwards of two hundred thousand. Typically, each such station has multiple dispensers, and it is not uncommon to find six, ten, or even many more dispensers at each such station. The total number of such dispensers in this country exceeds two and one-half million. Each such dispenser has at least one filter that must periodically be replaced.

Most if not all such dispensers will have at least a water/fuel filter in close proximity to the outlet for dispensing such fuel. Such filters are typically horizontal, and typically have a capacity of approximately a quart or so of filtered fluid. Such filtered fluids are not pure, however, but are themselves normally contaminated by hazardous materials such as benzene, toulene and the like. Not only is the approximate volume of such filters inevitably spilled each time such filters are removed, but still more product, from the line upstream of such filters to the nearest check valve, is lost as well. In sum, the spillage from each change of filter may total from approximately one to two quarts.

While the total amount of spillage from the removal of any one filter may seem small, the effect is not innocuous. As but one example, gasoline does not degrade in the soil, but remains potent almost indefinitely. Most soils are of types that permit hydrocarbons to leach downward to underground water reservoirs, the pollution of which is an ever-increasing problem. So severe has the problem become in this country that in many localities any spillage greater than two fluid ounces requires formal notification to the proper authorities and initiation of formal decontamination procedures.

Spillage of one to two quarts per filter change per dispenser times an average of twelve such filters per station results in a total spillage of three to six gallons per station. If each station must change its filters even once every quarter, then the average station would be spilling on the order of 12 to 24 gallons of hazardous fluids, annually, just from such filter changes alone.

Those skilled in the art appreciate that such spills do not occur onto the concrete aprons surrounding the individual dispensing stations but directly onto the earth below such stations, and, thus, readily infiltrate the water table which in many localities may be but a very few feet below the surface. Those skilled in the art also appreciate the enormous investment that has been made in the dispensing apparatus now in use, and that replacement of such in any reasonably brief time period would be prohibitively expensive. There has thus existed for a long time an industry-wide need for moderately-priced apparatus to prevent such spillage which can be applied to existing equipment without the need for expensive re-design or expensive retrofitting. The present invention fulfills that long-standing need. In addition, should the present invention be widely adapted, then several million gallons of hydrocarbons presently polluting our nation's aquifers, annually, will have been eliminated.

OBJECTS OF THE INVENTION

It is therefore a principal object of the present invention to eliminate a major point source of contamination of the nation's underground water resources.

It is another object of the present invention to prevent spillage of hydrocarbons at dispensing stations when changing filters at such stations.

It is still another object of the present invention to impede the improper replacement of such filters so as to make such spillage much less likely to occur.

These and other objects will be apparent to those skilled in the art upon careful consideration of the teachings herein.

SUMMARY OF THE INVENTION

A preferred embodiment of the present invention will perform several functions simultaneously. That is to say, such a preferred embodiment will readily accommodate existing equipment at existing dispensing stations without expensive modification or retrofitting, and preferably will eliminate the accidental spillage of such hydrocarbons altogether. The former may be accomplished by any of a variety of different means, such as a snugly fitting ring sized to receive the particular filter with which it is designed to be used and supporting collecting and diverting apparatus for intercepting the fluid spilled when changing filters. The latter may preferably be accomplished at least in part by extending the collecting and diverting apparatus so as to largely block access to such filters except from an outermost end thereof and except until after suitable collection apparatus is in place. While the present invention will not prevent contamination by one determined to contaminate, it will prevent contamination by accident and such contamination as may be caused by forgetfulness, inattention or inadvertance.

BRIEF DESCRIPTION OF THE DRAWINGS

FIG. 3B is a side view of an alternative form of impeding container depending from the associated diverting and collecting apparatus.

DETAILED DESCRIPTION OF THE PREFERRED EMBODIMENT

Figure 1A:
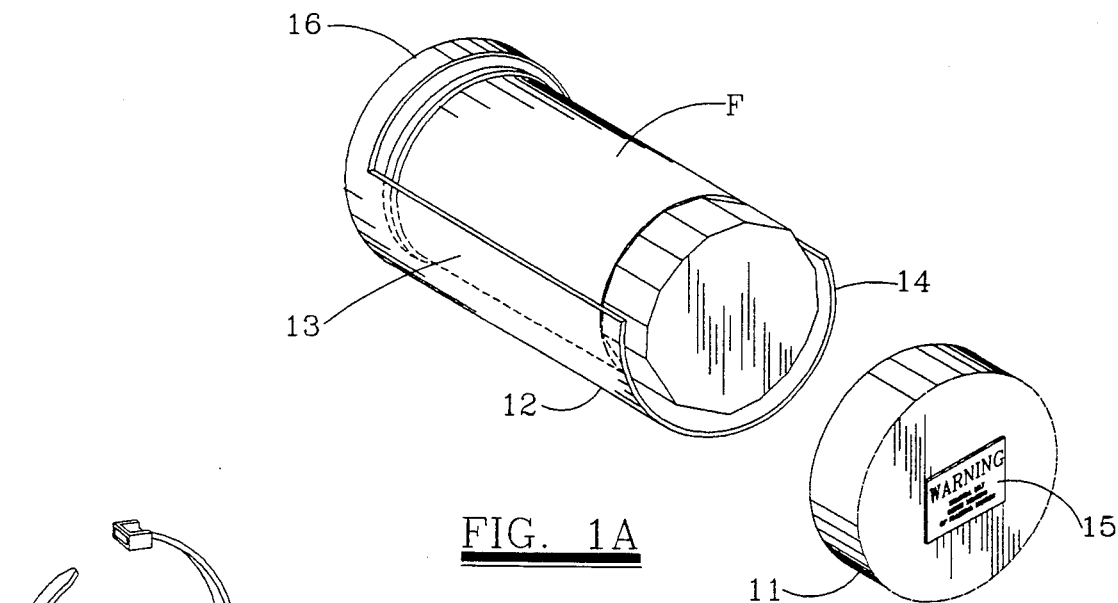
FIG. 1A is an isometric view of one preferred embodiment in 'exploded' form for clarity.

FIG. 1 is an isometric view of one preferred embodiment of the preferred invention, with impeding container 11 shown removed from the body 12 of the collecting and diverting apparatus for clarity. Body 12 is shown at least partially surrounding filter F, with sides 13 and 14 preferably extending far enough upwards to prevent maintenance personnel from being able to grasp filter F from above well enough to remove it by hand. It should be readily understood that when impeding container 11 is in position on body 12, a filter wrench may not be slipped over the end of filter 12 to permit removal in that manner. Preferably, impeding container 11 will display a suitable warning or cautionary notice 15 to further alert such personnel in the proper usage of this invention.

Figure 2A:
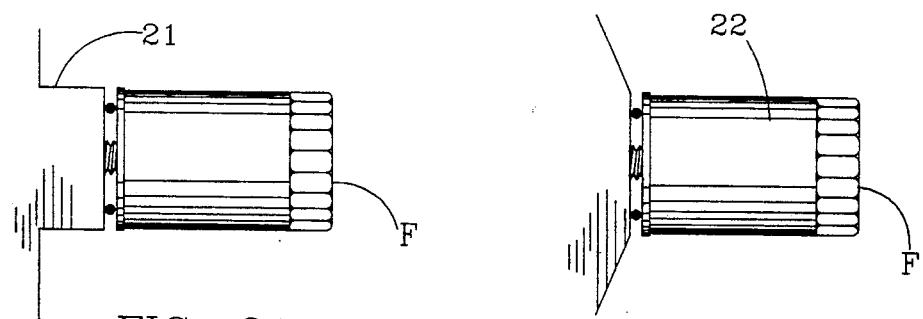
FIG. 2A is a side view of one of the two types of support structures most often presented by dispensing stations.
Figure 2B:
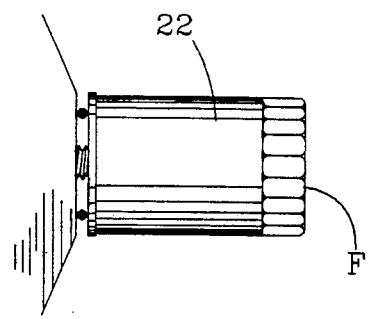
FIG. 2B is a side view of the other of the two types of support structures most often encountered.

Generally, dispensing stations will support such filter means by one of two methods, i.e., either by a protrusion 21 as shown in FIG. 2A which roughly approximates the general configuration and circumferential size of filter F, or by an essentially planar surface 22 as shown in FIG. 2B. For support methods such as FIG. 2A, it is convenient to form a support ring 16 integrally with body 12 sized so as to be slideably engageable over filter F and protrusion 21. Alternatively, such ring or integral support means 16 may be omitted and the support function provided by a discrete element such as buckle 17 of FIG. 18. Buckle 17 may conveniently be a suitably-sized one-way nylon strap of the type commonly used for wiring harnesses, for example. If a discrete means is employed to secure body 12 to protrusion 21, it may be preferable to have some form of retaining means such as protuberances 18 near an end of body 12 so as to prevent body 12 from being pulled out of buckle 17. Alternatively, such buckles may be attached to body 12 as by epoxy, glue, or other means.

Figure 1B:
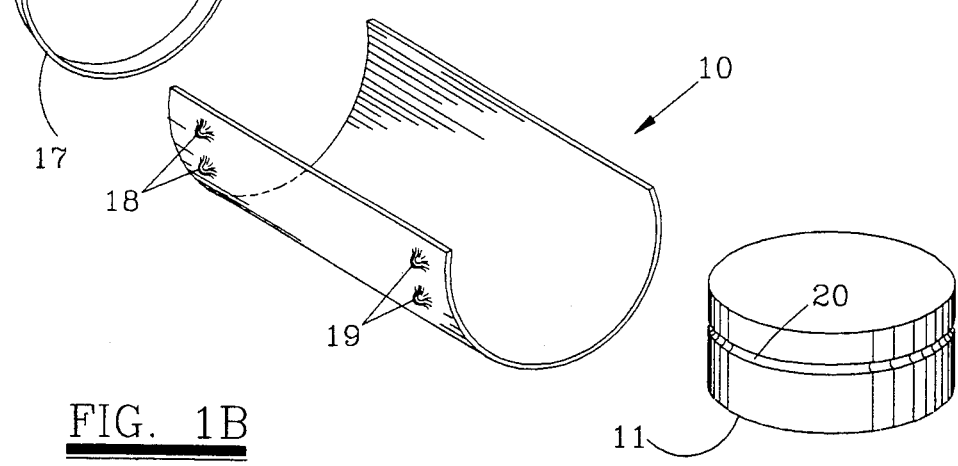
FIG. 1B is a similar view of another embodiment.

FIGS. 1A and 1B may thus be considered to depict the simplest form of the present invention. Impeding container 11 may be removably held in place upon body 12 by a simple frictional fit as depicted in FIG. 1A, by mechanical fit of snappably removeable groove 20 over protuberances 19 as depicted in FIG. 1B, by threaded engagement, or by any of a number of conventional engagement means. In its simplest use, impeding container 11 may be removed by maintenance personnel, thereby permitting a filter wrench to be slipped over filter F from the then-exposed end of body 12. The impeding container 11 may be held adjacent the outer lip of body 12 with one hand while the other hand loosens filter F with the filter wrench; as soon as the filter is loosened, the product within the filter will emerge near its connection with the dispensing station, be collected by body 12 and diverted to container 11 for subsequent disposal or use.

Figure 3A:
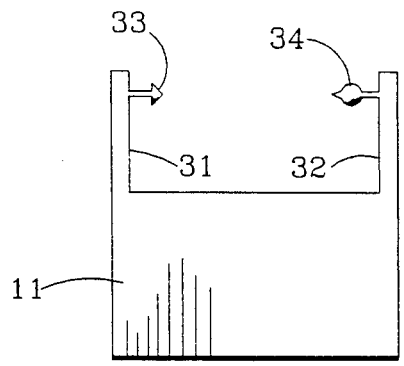
FIG. 3A is an end view of an alternative form of the impeding container of the present invention.
Figure 2A:
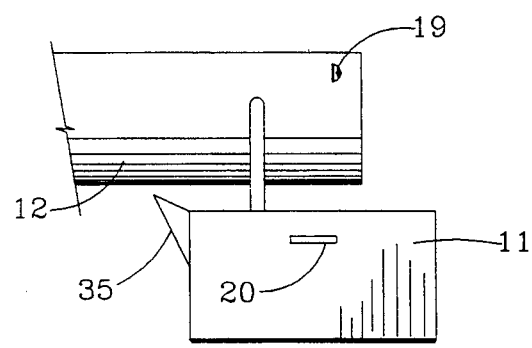

FIG. 3A depicts an end view of an alternative embodiment wherein container 11 has a pair of support arms 31, 32 and dogs 33, 34. FIG. 3B depicts this alternative embodiment in a side view with container 11 in position to receive the spillage collected by body 12 without being supported by maintenance personnel. Pliable arms 31, 32 may easily be disengaged from receiving holes (not shown) in body 12 to permit subsequent proper disposal of the spilled product. If it is desired to permit the ready removal of container 11 from its engagement with body 12, then both dogs 33 and 34 may be of the type shown at 33. Conversely, should it be desired not to permit the ready removal of container 11, then both dogs 33 and 34 may be formed of the type shown at 34. If the latter, then suitable means for properly emptying such container should be provided, such as spout 35 in FIG. 3B or spigot or other means. Container 11 will preferably be sized so that the panel of the dispensing station may not be put in place unless and until such container is returned to its former position, whereupon it will again serve to impede the improper removal of filter F. At least a partial retaining groove 20 and protuberance 19 may be formed in container 11 and body 12, respectively, if desired.

Figure 4:
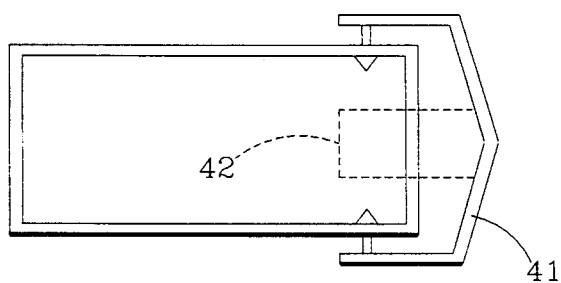
FIG. 4 is a plan view of one form of an impeding extender depending from the associated diverting and collecting apparatus.

For applications in which more product and/or other deleterious fluids may escape from a loosened filter than can be caught by a container 11, it may be preferable to substitute an extender for the container 11. One such extender is illustrated in FIG. 4, wherein extender 41 functions to extend the flow of product from a path which otherwise would permit it to fall onto the ground to a path which would cause it to flow onto the surrounding concrete apron or onto the attendant himself if no external container is placed in place before loosening the filter. While not preferred, this arrangement at least offers totally negligent personnel an opportunity to collect product spilled onto concrete, plus, such negligent personnel having to dodge the product flow should help to motivate such personnel to collect such spillage with a suitable container in the future. In any event, such an extender will serve to prevent all but intentional spills. Shown in dashed lines is an optional blocking bar or handle 42 to prevent a filter wrench from being engageable while the extender is in the up position.

Figure 5A:
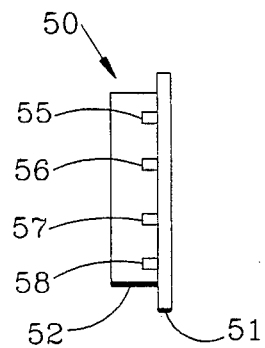
FIG. 5A is a side view of a flow-through retainer or support device for the impeding, collecting and diverting apparatus of the present invention.
Figure 5B:
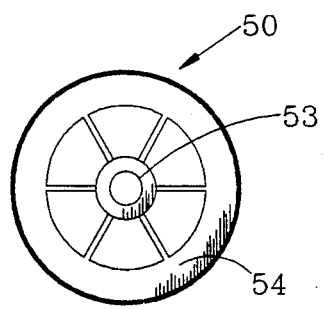
FIG. 5B is a frontal view of one form of the device of 5A.

For those applications wherein the dispensing stations offer an essentially planar surface from which to support such filters, as depicted in FIG. 2B, it will be preferable to incorporate a flow-through retainer or support device somewhat similar to that illustrated in FIGS. 5A and 5B. FIG. 5A is a side view and FIG. 5B a frontal view of such a retainer. The retainer 50 may be seen from FIG. 5A as having a lip 51 projecting out beyond the periphery of the body 52 of such retainer. To help minimize the likelihood of a filter wrench inadvertantly releasing retainer 50, body 52 may be sized approximately the size of filter F and intervening lip 51 sized somewhat larger than filter F. To use such a retainer, filter F must be removed and frequently the threaded central support for such filters replaced by a longer such support. FIG. 5B reveals a central orifice 53 adapted to be secured upon the threaded receiver intended to receive filter F and permitting fluid flow therethrough. A plurality of orifices surrounding such central orifice 53 will permit fluid flow in a direction opposite to that of central orifice 53. In addition, such plurality may be designed so that precise alignment with the corresponding orifices of the dispensing station support structure will not be required. The width of the outer surface 54 should be large enough to permit sealing engagement thereof with the rubber sealing ring normally present on such filters. It is deemed preferable to incorporate similar sealing means on the reverse side of retainer 50 for sealingly engaging the support structure of the dispensing station.

Figure 6:
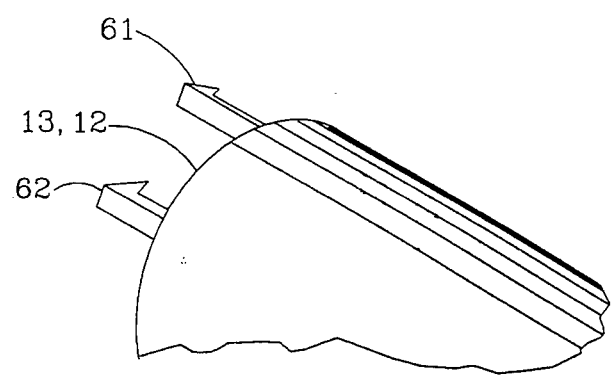
FIG. 6 is an isometric view of one embodiment of the attaching end portion only of the impeding, collecting and diverting apparatus of the present invention.

It should be appreciated that a suitably designed retainer will perform several functions. First, of course, it will permit use of the spillage inhibitors hereinabove described for protruding support surfaces with dispensers of the planar support surface type. In addition, however, retaining means 52 will permit spillage inhibitors to be permanently locked into position, i.e., such that such inhibitors may not be removed without destruction of the material of such inhibitors themselves. If the protrusions 18 of inhibitor 10 are formed so as to protrude radially inward, it may be seen that such protrusions will prevent the body 12 of inhibitor 10 from being pulled away from the retainer 50. Alternatively, the attaching end of body 12 may incorporate a series of dogs 61, 62, etc. around such attaching end, as shown in FIG. 6, which may be received by a corresponding series of recesses 55, 56, etc. in retainer 50. Such an arrangement will not only prevent inhibitor 10 from being pulled away from such retainer but will also prevent inhibitor 10 from being rotated with respect to its longitudinal axis about retainer 50. It may therefore be preferred to incorporate some such apparatus even for those support structures which offer a protruding support surface of the type shown in FIG. 2A. A least preferred embodiment of inhibitor 10 would incorporate an inwardly-turned flange on the outer end of inhibitor 10 so as to form a well in such inhibitor from the bottom of which tubing, either flexible or permanent, could direct the hazardous waste flow to whatever location may be desired.

Other alternate forms of the present invention will suggest themselves from a consideration of the apparatus and principles hereinbefore discussed. Accordingly, it should be clearly understood that the systems and techniques depicted in the accompanying drawings and described in the foregoing explanations are intended as exemplary embodiments of the invention and not as limitations thereto.

What is claimed is:

1. A hazardous material spillage inhibitor, comprising:
    means for collecting the spillage resulting from disconnecting a filter from a source of hazardous materials,
    means for diverting said spillage to said means for collecting, and said means for collecting or said means for diverting being operable, by positioning with respect to said filter, as a means for impeding disconnection of said filter until said collecting and diverting means are positioned therefor.

2. The hazardous material spillage inhibitor of claim 1, further comprising means for securing said impeding means to a support means for said filter.

3. The hazardous material spillage inhibitor of claim 2, wherein said securing means comprises permanent securing means.

4. The hazardous material spillage inhibitor of claim 2, wherein said securing means further comprises means integral therewith for permitting the flow of hazardous materials therethrough.

5. The hazardous material spillage inhibitor of claim 4, wherein said securing and integral flow-through means further comprises means for permitting the flow of unfiltered materials along a first flow path, means for permitting the flow of filtered materials along another flow path, and means for preventing communication between said filtered and said unfiltered materials.

6. The hazardous material spillage inhibitor of claim 1, further comprising means for containing said collected spillage.

7. The hazardous material spillage inhibitor of claim 6, wherein said containing means is integral with at least a portion of said impeding means.

8. The hazardous material spillage inhibitor of claim 5, wherein said integral securing and flow-through means further comprises means for securing said collecting means against inadvertant rotation thereof.

9. The hazardous material spillage inhibitor of claim 1, wherein said diverting means is integral with at least a portion of said impeding means.

10. The hazardous material spillage inhibitor of claim 1, wherein said diverting means is removeably affixed to said collecting means.

11. A method for preventing the unintentional spillage of hazardous materials, comprising the steps of:
    securing collecting means in the vicinity of apparatus for disconnection of filter from a source of hazardous materials,
    securing in the vicinity of said collecting means means for diverting said spillage to said collecting means, and
    positioning said collecting means or said diverting means with respect to said filter so as to disconnection of said filter until such collecting and diverting means are positioned therefor.

12. A method for preventing the unintentional spillage of hazardous materials, comprising the steps of:
    securing collecting means in the vicinity of apparatus for disconnection of filter from a source of hazardous materials,
    securing in the vicinity of said collecting means means for diverting said spillage to said collecting means, and
    positioning said collecting means or said diverting means with respect to said filter so as to disconnection of said filter until the preventing function of said preventing means has been intentionally negated.

* * * * *